United States Patent
Iannazzi

(10) Patent No.: US 7,570,393 B2
(45) Date of Patent: Aug. 4, 2009

(54) METHOD FOR CALIBRATION OF A PRINTER

(75) Inventor: Craig Iannazzi, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1050 days.

(21) Appl. No.: 11/087,036

(22) Filed: Mar. 22, 2005

(65) Prior Publication Data

US 2006/0215239 A1    Sep. 28, 2006

(51) Int. Cl.
G06K 15/00 (2006.01)
G03B 27/00 (2006.01)
H04N 1/46 (2006.01)

(52) U.S. Cl. .................. 358/3.1; 355/405; 358/503
(58) Field of Classification Search ........... 355/401, 355/402, 405; 399/128; 382/274; 358/3.1, 358/3.23, 3.27, 3.26, 502, 503, 504; 347/131
See application file for complete search history.

(56) References Cited

U.S. PATENT DOCUMENTS

| | | | |
|---|---|---|---|
| 5,268,708 A | 12/1993 | Harshbarger et al. | |
| 5,428,371 A | 6/1995 | Fox et al. | |
| 5,461,462 A | 10/1995 | Nakane et al. | |
| 6,906,828 B2 * | 6/2005 | VanDuyn et al. | 358/2.1 |
| 7,324,127 B2 * | 1/2008 | Umeki et al. | 347/221 |
| 2002/0085233 A1 * | 7/2002 | Degani et al. | 358/3.06 |
| 2002/0085234 A1 * | 7/2002 | VanDuyn et al. | 358/3.06 |
| 2002/0085235 A1 * | 7/2002 | Degani et al. | 358/3.06 |
| 2005/0046655 A1 * | 3/2005 | Iannazzi | 347/19 |
| 2005/0099488 A1 * | 5/2005 | Umeki et al. | 347/221 |
| 2005/0140999 A1 * | 6/2005 | Morii et al. | 358/1.9 |
| 2006/0176526 A1 * | 8/2006 | Iannazzi | 358/504 |
| 2006/0181721 A1 * | 8/2006 | Kulkarni et al. | 358/1.9 |

FOREIGN PATENT DOCUMENTS

| | | |
|---|---|---|
| EP | 0 528 441 | 8/1992 |
| EP | 0 773 470 | 5/1997 |
| EP | 1 443 749 | 4/2004 |

* cited by examiner

Primary Examiner—Jerome Grant, II
(74) Attorney, Agent, or Firm—Nelson Blish

(57) ABSTRACT

A method for calibrating a first image processing apparatus at a first location with a control image processing apparatus at a second location. The method comprises obtaining a plurality of individual exposure levels and plotting them against time creating a deviation history and comparing it to the operating specification for the control image processing apparatus. If the deviation history is within the operating specification, initiate a calibration, if not adjust the exposure levels and then initiate calibration. The calibration comprises preparing a calibration curve of exposure level versus density for a plurality of shipped thermal donors; computing an exposure modification curve by comparing a control thermal receiver to the shipped thermal receivers; transmitting the calibration and then the exposure modification curve to the first image processing apparatus; and adjusting the first image processing apparatus exposure levels to conform to the calibration curve and the exposure modification curve.

15 Claims, 9 Drawing Sheets

METHOD FOR CALIBRATION OF A PRINTER

FIELD OF THE INVENTION

The present invention relates to a method for calibrating an image processing apparatus, an in particular for laser printers, ink jet printers, offset printers and the like.

The method relates to calibrating a first image processing apparatus at a first location with a control image processing apparatus at a second location. The method uses a plurality of calibrations including calibration curves of exposure levels versus density for a plurality of shipped thermal donors, a plurality of exposure modification curves for a plurality of shipped thermal receivers, and forming calibration curves and exposure modification curves to adjust the quality of the image density for a defined image processing apparatus and using a specific media with a high level of accuracy.

BACKGROUND OF THE INVENTION

Image processing apparatus comes in many varieties, including equipment depicted in commonly assigned U.S. Pat. No. 5,428,371, which is an image processing apparatus having half-tone color proofing capabilities. In this patent, the image processing apparatus is arranged to form an intended image on a sheet of thermal print media by transferring dye from a sheet of dye donor material to a thermal print media by applying thermal energy to the dye donor material to transfer dye to the thermal print media, thereby forming an intended image. Such image processing apparatus is made of a material supply assembly, a lathe bed scanning subsystem which includes a lathe bed scanning frame, translation drive, translation state member, printhead, and vacuum imaging drum, thermal print media and dye donor material exit transports.

The operation of the image processing apparatus comprises feeding a sheet of thermal media from the media roll to the vacuum drum, partially wrapped around the drum, cut to length, then wrapped fully around the drum. A length of dye donor from a roll form is similarly transported to the drum, partially wrapped around the drum, cut to a desired length, then fully wrapped around the vacuum drum. The dye donor material is wrapped around the vacuum imaging drum, such that it is superposed in registration with the thermal print media. The translation drive, part of the scanning subsystem, traverses the printhead and translation stage member axially along the vacuum imaging drum in coordinated motion with the rotating vacuum imaging drum to produce the intended image on the thermal print media.

The printhead includes a plurality of laser diodes that are coupled to the printhead by fiber optic cables that can be individually modulated to supply energy to selected areas of the donor in accordance with an information signal. The printhead includes a plurality of optical fibers coupled to the laser diodes at one end and at the other end to a fiber optic array within the printhead. The printhead moves relative to the longitudinal axis of the vacuum imaging drum and dye is transferred to the thermal print media as the radiation, transferred from the laser diodes by the optical fibers to the printhead to the dye donor material, is converted to thermal energy in the dye donor material.

Color variation is typically a result of variation of the individual color density used to define the desired color. There are many factors that influence the variation of a color in a proof. Factors include but are not limited to environment variability, density calibration technique, optical noise, thermal media coating quality, densitometer measurement noise, lamination noise, and digital proofer focus errors.

Due to factors that cause density variation, calibration of density is required to achieve high levels of consistency between a requested or desired density and the average density on an imaged proof. Calibration to the average proof density is desired due to the fluctuation of density within a single proof. To be most color accurate across the entire proof the average density should closely match the requested density.

Some early digital proofers, such as U.S. Pat. No. 5,268,708 utilized a linear calibration model over a specified density range. Specifications for the output density range were developed from printing standards. The SWOP standard was the model used for the calibration range for U.S. Pat. No. 5,268,708.

Presses are capable of producing more than cyan, magenta, yellow, and black output colors. Often special colors are added to expand the color of a print. Colors from a press are limited to the various ink colors that can be mixed or created—a virtually endless assortment. Presses therefore had a much larger color gamut than proofers, which are limited by the color gamut produced by thermal dye.

With the introduction of U.S. Pat. No. 5,428,371, color gamuts were expanded using a concept named "Recipe Color." The amount of usable density range was increased for each thermal dye donor. Multiple passes of the same bitmap used for a single color plane were imaged using different thermal dye donor material. This allowed for custom color creation, and with the introduction of a few special thermal dye donor material, the color range of a proof is extended to closely match the output of a printing press using many different inks.

A need has existed for a fast calibration system with high level of accuracy that can be used in a variety of image processing systems, including laser printers, and ink jet printers, fax machines, and copy machines.

SUMMARY OF THE INVENTION

Briefly summarized, according to one aspect of the present invention, a method for calibrating a first image processing apparatus at a first location (customer) with a control image processing apparatus at a second location (factory) comprising the steps of obtaining a plurality of individual exposure levels for a control image processing apparatus, such as a laser printer, plotting individual exposure levels against time to obtain a deviation history for the control image processing apparatus relative to print density, comparing the deviation history to an operating specification for the control image processing apparatus to determine if the control image processing apparatus has drifted off the operating specification; adjusting exposure levels for the control image processing apparatus if the data points are outside of the operating specifications, preparing a calibration curve of exposure level versus density for a plurality of shipped thermal donors; comparing the value of a control thermal receiver to a plurality of shipped thermal receivers to form an exposure modification curve; transmitting said calibration curve to the first image processing apparatus; and transmitting said exposure modification curve to the first image processing apparatus.

According to one embodiment, a target is imaged on a first layered assembly to create a first image. This first layered assembly has at least a first thermal donor, having a first exposure calibration curve measured from the control image processing apparatus disposed on a first thermal receiver having a first exposure modification curve measured from the control image processing apparatus.

Next, the first image is scanned into host software on the image processing apparatus and a first image processing apparatus exposure calibration curve is formed from the scanned image.

After that, a target is imaged on a second layered assembly to create a second image. This second layered assembly is identical to the first layered assembly. The second image is scanned into the same host software and a second image processing apparatus exposure calibration curve is formed.

The first image processing apparatus exposure calibration curve and the second image processing apparatus exposure calibration curve are used to create an average image processing apparatus exposure calibration curve by averaging. The first exposure calibration curve from the control image processing apparatus is then averaged with the second exposure calibration curve from the control image processing apparatus to form an average exposure calibration curve. The first exposure modification curve for the first thermal receiver of the first layered assembly is then averaged with a second exposure modification curve for second thermal receiver of the second layered assembly. An exposure lookup curve is calculated by plotting the average image processing apparatus exposure calibration curve against said average exposure calibration curve. A third layered assembly identical to the first and second layered assembly is then placed on the image processing apparatus and a third exposure modification curve is ascertained. A fourth exposure modification curve is developed by using the first, the second, and the third exposure modification curve. A third image processing apparatus exposure calibration curve is calculated for the third layered assembly by applying the exposure lookup curve to the third exposure calibration curve. The third image processing apparatus exposure calibration curve is then adjusted using the fourth exposure modification curve to create a resultant exposure calibration curve to apply to the image processing apparatus for use with the third layered assembly.

The invention and its objects and advantages will become more apparent in the detailed description of the preferred embodiment presented below.

BRIEF DESCRIPTION OF THE DRAWINGS

In the detailed description of the embodiments presented below, reference is made to the accompanying drawings, in which.

The present embodiments are detailed below with reference to the listed Figures.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

The present embodiments relate to methods for calibrating a first image processing apparatus at a first location with a control image processing apparatus at a second location. The first location can be the location of a customer and the second location can be the location of a factory or similar site. The methods provide manners for decreased calibration times and require fewer materials in order to calibrate the image processing apparatus. The methods allow for bypass thermal media exposure calibration for every roll change.

The methods allow the user to create thermal media exposure calibration data using a control imaging device that can drift over time. The methods uses an increase in the number of data points used for density and exposure modeling. The increase correlates to an increase in density accuracy. The increased accuracy makes the process of locating the average density request in noisy density regions easier than current methods.

Figure 1:
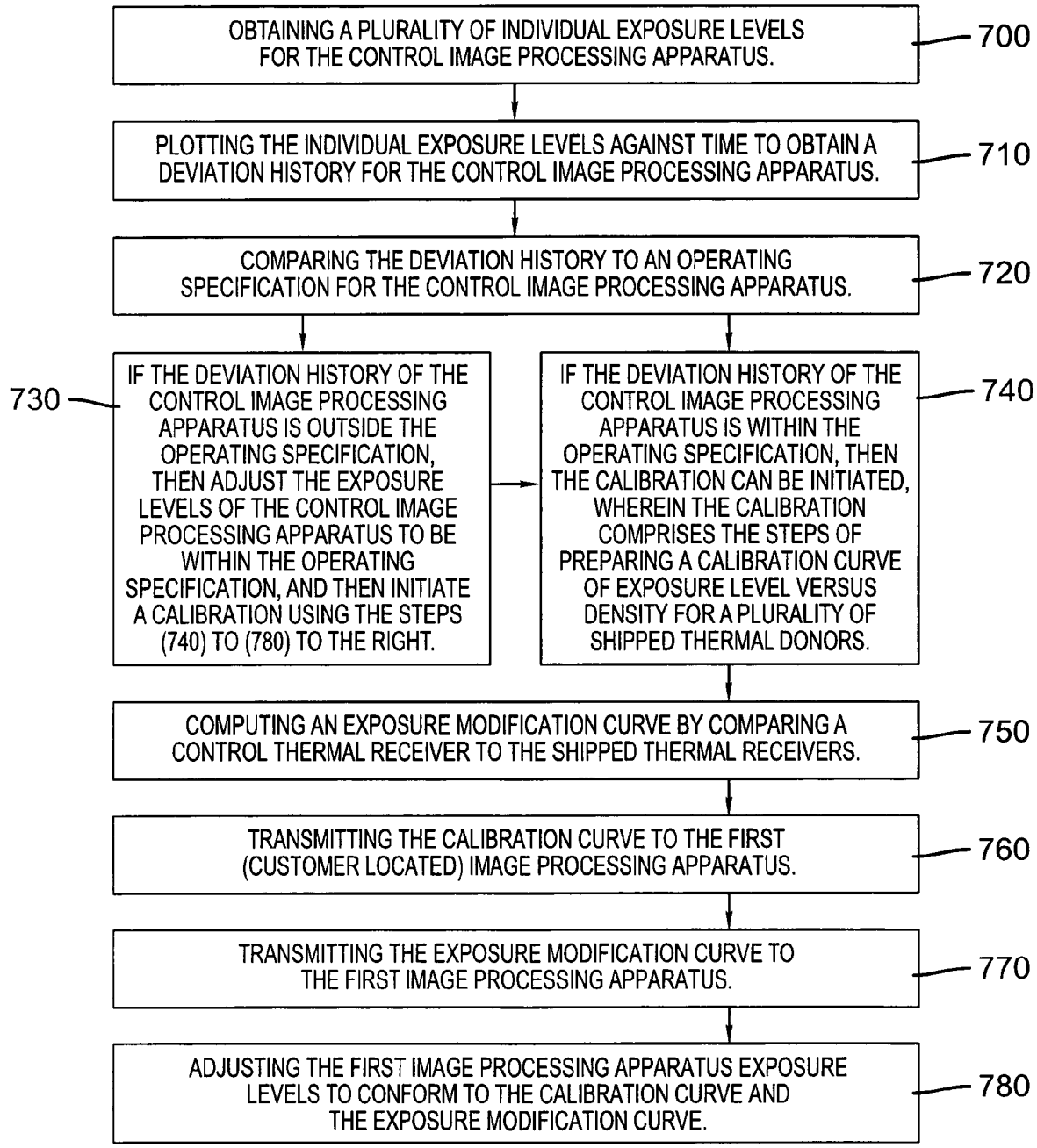
FIG. 1 is a flow diagram of an embodiment of a method for calibrating an image processing apparatus.

With reference to the figure, FIG. 1 is a flow diagram of an embodiment of a method for calibrating an image processing apparatus. The methods can be used on numerous types of image processing apparatus, such as laser printers, ink jet printers, offset presses, photocopiers, fax machines, and similar apparatus and combinations.

The method comprises the steps of first obtaining a plurality of individual exposure levels for the control image processing apparatus 700, then plotting the individual exposure levels against time to obtain a deviation history for the control image processing apparatus 710. The next step can be comparing the deviation history to an operating specification for the control image processing apparatus 720. If the deviation history of the control image processing apparatus is within the operating specification, then the calibration can be initiated, wherein the calibration comprises the steps of preparing a calibration curve of exposure level versus density for a plurality of shipped thermal donors 740. The next step of the calibration procedure can be computing an exposure modification curve by comparing a control thermal receiver to the shipped thermal receivers 750, then transmitting the calibration curve to the first (customer located) image processing apparatus 760. Continuing with the calibration procedure the next step can be transmitting the exposure modification curve to the first image processing apparatus 770 and adjusting the first image processing apparatus exposure levels to conform to the calibration curve and the exposure modification curve 780. If the deviation history of the control image processing apparatus is outside the operating specification, then adjust the exposures levels of the control image processing apparatus to be within the operating specification 730, and then initiate a calibration using the steps 740 to 780.

The calibration can also be preformed by the steps of preparing a calibration curve of exposure level versus density for a plurality of shipped thermal donors using the control imaging apparatus, then transmitting the calibration curve to the first (customer located) image processing apparatus. The last step of the calibration can be adjusting the first image processing apparatus exposure levels to conform to the control imaging apparatus measured calibration curve and the control imaging apparatus measured exposure modification curve.

Figure 2:
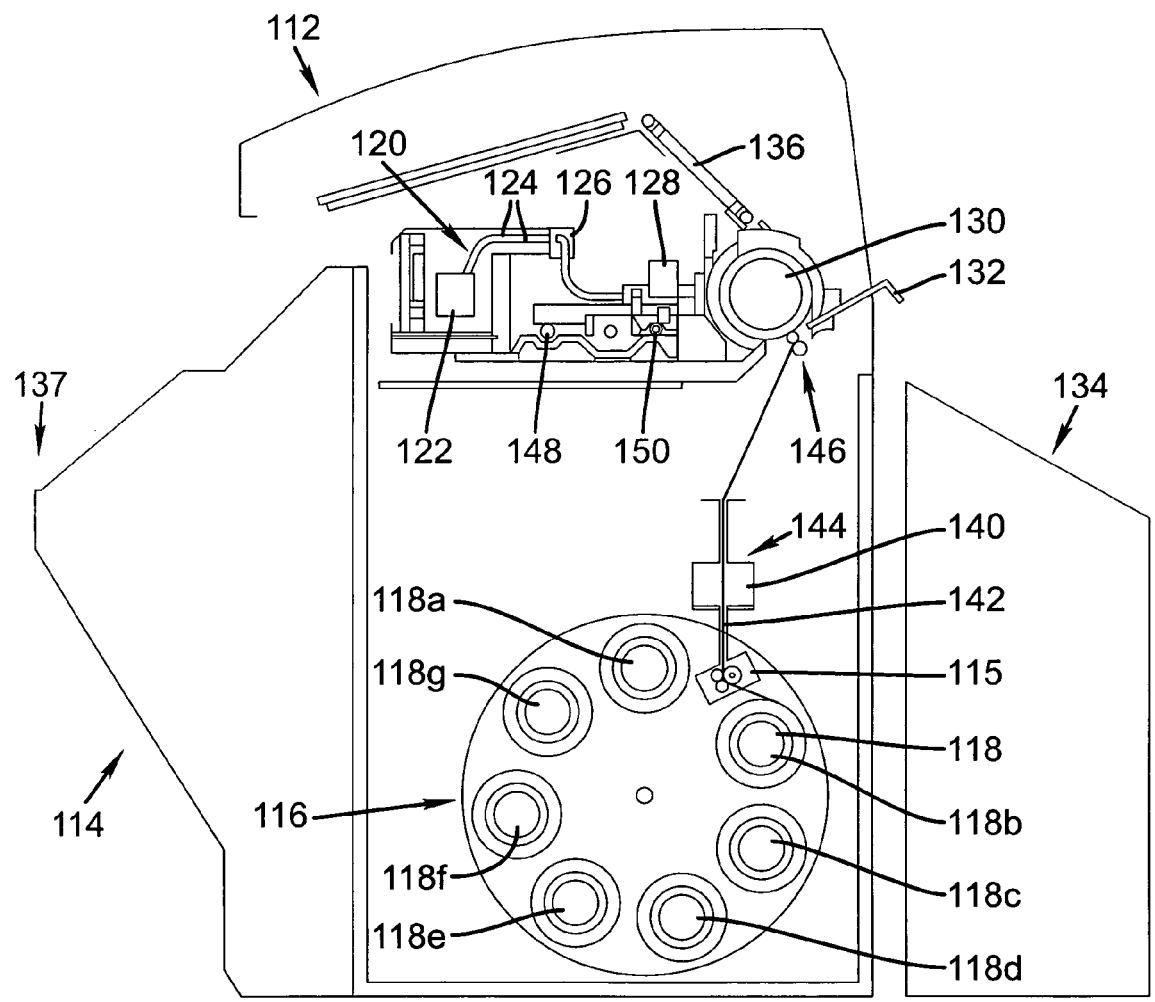
FIG. 2 examples an image processing apparatus usable with the invention.

FIG. 2 illustrates an image processing apparatus usable with the embodied methods. The image processing apparatus can have an image processor housing 112 that provides a protective cover. A movable, hinged image processor door 114 is attached to the front portion of image processor housing 112 permitting access to a media carousel 116. A roll of donor roll material 118a can be connected to a media carousel 116 in a lower portion of image processor housing. Up to seven rolls of roll media can be used 118a, 118b, 118c, 118d, 118e, 118f and 118g. One roll of media 118g can be thermal print media used to receive the donor material. This thermal print media 118g can be passed to vacuum imaging drum 130 and can ultimately be cut into donor sheet material (not shown). In this regard, a media drive mechanism 115 can be attached to the thermal print media 118g, and can include three media drive rollers (not shown) through which the thermal print media of interest can be metered upwardly into a media knife assembly 144. After thermal print media reaches drum load roller 146, media drive rollers (not shown) can cease to drive the donor roll material and media knife blades 140, 142 positioned at the bottom portion of media knife assembly can be engaged to cut the thermal print media roll into thermal print media sheets. Drum load roller 146 can press the cut thermal print media against the vacuum imaging drum 130 while the vacuum imaging drum 130 slowly rotates the cut media (not shown) around vacuum imaging drum 130.

Each remaining roll of donor material can be a different color, typically black, yellow, magenta and cyan. Special colors include but are not limited to orange, green, blue, metallic, and white. These donor roll materials are passed to the vacuum imaging drum 130 and are ultimately cut into donor sheet materials (not shown) for forming the medium from which colorant imbedded therein are passed to thermal print media resting thereon, which process is described in detail below.

A media drive mechanism 115 can be attached to each roll media of donor roll material, and includes three media drive rollers (not shown) through which the donor roll material 118a, 118b, 118c, 118d, and 118e of interest can be metered upwardly into a media knife assembly 144. After donor roll material reaches drum load roller 146, media drive rollers (not shown) can cease driving the donor roll material and the media knife blades 140, 142 can be positioned at the bottom portion of media knife assembly to cut the donor roll material into donor sheet materials. Drum load roller 146 can press the cut media against the vacuum imaging drum 130 while the vacuum imaging drum 130 slowly rotates the cut media (not shown) around vacuum imaging drum 130. The donor sheet material can rest atop the thermal print media (not shown) with a narrow space between the two created by microbeads embedded in the surface of the thermal print media.

A laser the cut media against the vacuum imaging drum 130 while the vacuum imaging drum 130 slowly rotates the cut media (not shown) around vacuum imaging drum 130. The donor sheet material can rest atop the thermal print media (not shown) with a narrow space between the two created by microbeads embedded in the surface of the thermal print media. assembly 120 includes a quantity of laser diodes 122 in its interior. Laser diodes 122 can be connected via fiber optic cables 124 to a distribution block 126 and ultimately to printhead 128. Printhead 128 can direct thermal energy received from laser diodes 122 causing the donor sheet material to pass the desired colorant across the gap and onto the thermal print media (not shown).

In operation, vacuum imaging drum 130 can rotate at a constant velocity. Printhead 128 can begin at one end of the thermal print media and can traverse the length of the thermal print media, transferring dye for a particular donor sheet material resting on the thermal print media. After printhead 128 has completed the transfer process for the donor sheet material resting on the thermal print media, the donor sheet material can then be removed from the vacuum imaging drum 130 and transferred out of image processor housing 112 via a skive or donor ejection chute 132. The donor sheet material can eventually come to rest in a donor waste bin 134 for removal by the user. The process can then be repeated for the other desired rolls of donor roll media.

After the color from all desired sheets of the donor materials have been transferred and the donor sheet materials have been removed from vacuum imaging drum 130, the thermal print media can be removed from vacuum imaging drum 130 and transported via a transport mechanism 136 to an exit tray 137. Thermal print media can then be laminated to a paper stock using an 800XL laminator.

Returning to FIG. 1, an embodiment of the method begins by obtaining individual exposure levels for the image processing apparatus (Step 700) and plotting the individual exposure levels against time to obtain a deviation history for the image processing apparatus (Step 710).

The deviation history can be compared to an operating specification for the image processing apparatus (Step 720).

If the deviation history is greater than the operating specification, a calibration method can be implemented.

Figure 3:
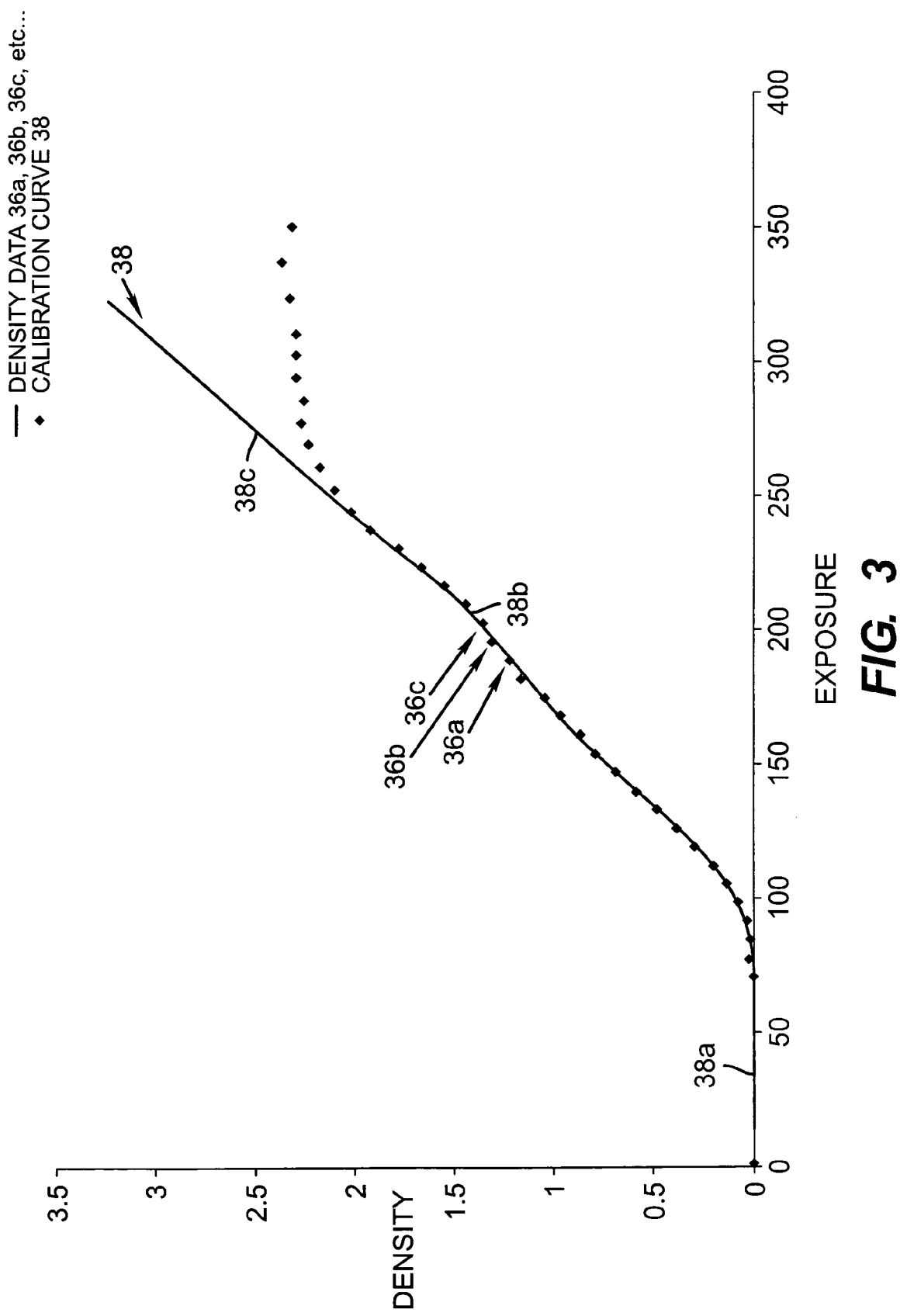
FIG. 3 shows an example of a calibration curve.

An embodiment of the calibration method entails preparing a calibration curve of exposure level versus density for a plurality of shipped thermal donors (Step 730). FIG. 3 shows an example of a calibration curve 38, wherein individual density values 36a, 36b, and 36c are noted.

An exposure modification curve can be computed by comparing a control thermal receiver to the shipped thermal receivers (Step 740).

The calibration curve and the exposure modification curve are transmitted to the image processing apparatus (Steps 750 and 760). Either one or both of the calibration curve and the exposure modification curve can be transmitted to the image processing apparatus using radio frequency identification (RFID) tag attached to each shipped thermal donor. Alternatively, either one or both of the calibration curve and the exposure modification curve can be transmitted to the image processing apparatus electronically.

The method ends by adjusting the image processing apparatus exposure levels to conform to the calibration curve and the exposure modification curve (Step 770).

In an alternative embodiment, the method can include the steps of imaging a target to a first layered assembly using the image processing apparatus to create a first image. The first layered assembly can include a first thermal donor with a first exposure calibration curve measured from the image processing apparatus. The first thermal donor can be disposed on a first thermal receiver that includes a first exposure modification curve measured from the image processing apparatus.

The first image can be scanned into host software on the image processing apparatus to form a first image processing apparatus exposure calibration curve.

The target can then be imaged onto a second layered assembly using the image processing apparatus to create a second image. The second layered assembly can include a second thermal donor with a second exposure calibration curve measured from the image processing apparatus. The second thermal donor can be disposed on a second thermal receiver that includes a second exposure modification curve measured from the image processing apparatus.

The second image can be scanned into the host software on the image processing apparatus to form a second image processing apparatus exposure calibration curve.

The first and second image processing apparatus exposure calibration curves are averaged to create an average image processing apparatus exposure calibration curve. Likewise, the first and second exposure calibration curves are averaged to create an average exposure calibration curve. Next, the first and second exposure modification curves can be averaged to create an averaged exposure modification curve.

An exposure lookup curve can be created by plotting the average image processing apparatus exposure calibration curve against the average exposure calibration curve.

The methods next entail loading a third layered assembly on the image processing apparatus. The third layered assembly can include a third thermal donor with a third exposure calibration curve measured from the image processing apparatus. The third thermal donor can be disposed on a third thermal receiver that includes a third exposure modification curve measured from the image processing apparatus.

A fourth exposure modification curve can be calculated by using the averaged exposure modification curve and the third exposure modification curve. The exposure lookup curve can be applied to the third exposure calibration curve to form a third image processing apparatus exposure calibration curve for the third layered assembly.

The third image processing apparatus exposure calibration curve is then adjusted using the fourth exposure modification curve to create a resultant exposure calibration curve. The resultant exposure calibration curve is applied to the image processing apparatus for use with the third layered assembly.

The image processing apparatus can be a laser printer, an ink jet printer, an offset press, a photocopier, a fax machine, or combinations thereof.

The step of transmitting the calibration curve and the exposure modification curve to the image processing apparatus can be preformed using a radio frequency identification (RFID) tag attached to each shipped thermal donor.

The step of transmitting the calibration curve and the exposure modification curve to the image processing apparatus can be performed electronically.

Figure 4:
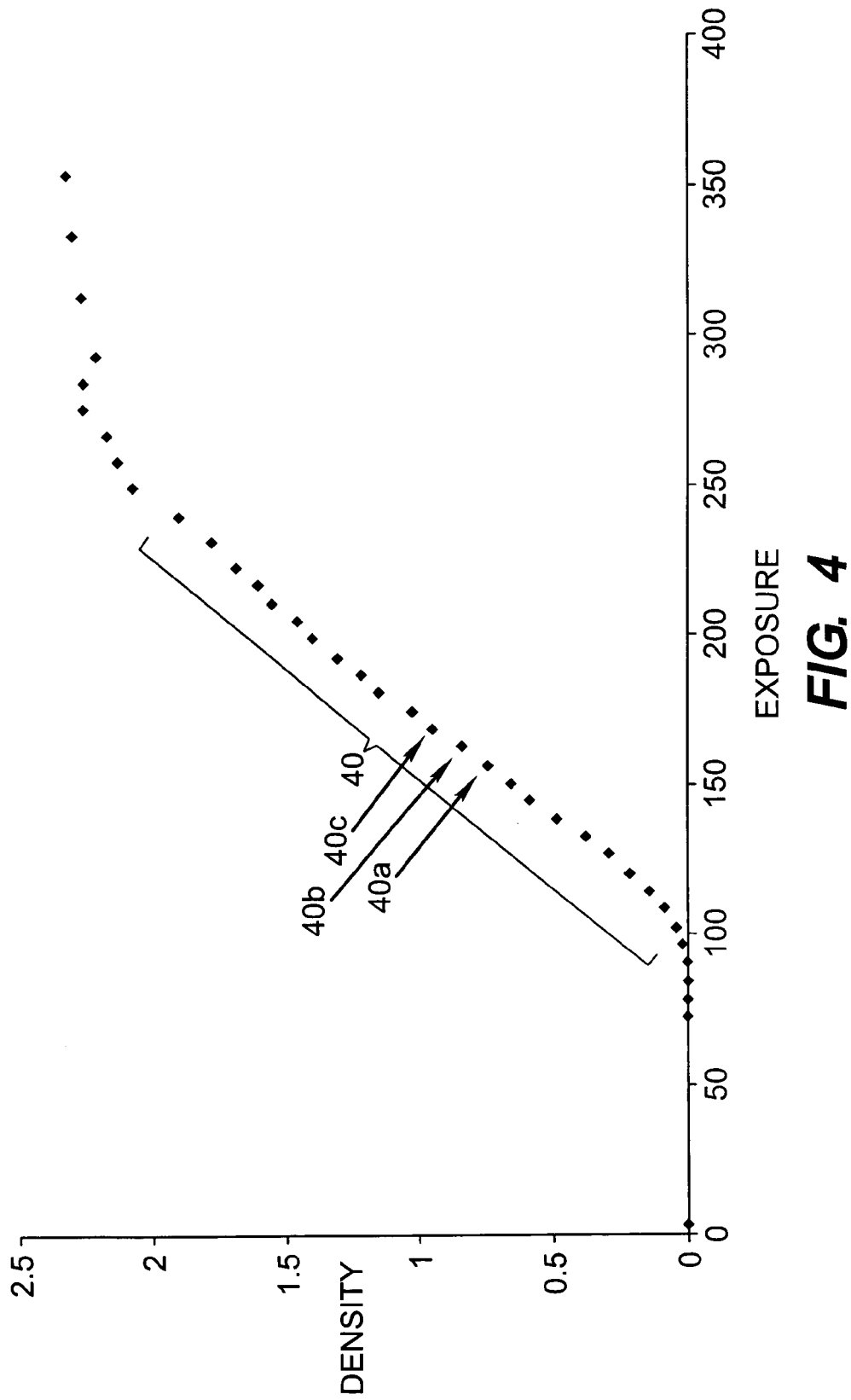
FIG. 4 show the results of optimizing exposures to produce a calibration target with desired density values.

FIG. 4 examples results of optimizing exposures to produce a calibration target with desired density values 40. Using the calibration curve for a given thermal donor and a given set of density requests for the corresponding thermal donor, the exposures for the calibration target can be calculated using linear interpolation. The calculations are performed by selecting exposure values for the density points 36a, 36b, and 36c (not shown in FIG. 4) that are just higher and lower than the optimized density request 40a, 40b, and 40c. Linear interpolation is then used on the set of density and exposure data points and the density request 40a, 40b, and 40c to calculate the exposure at the given optimized density request 40a, 40b, and 40c. For the lowest and highest optimized density request 40a, 40b, and 40c, linear extrapolation is used based on the two previous density points 36a, 36b, and 36c (not shown in FIG. 4), and corresponding exposure data points.

Figure 5:
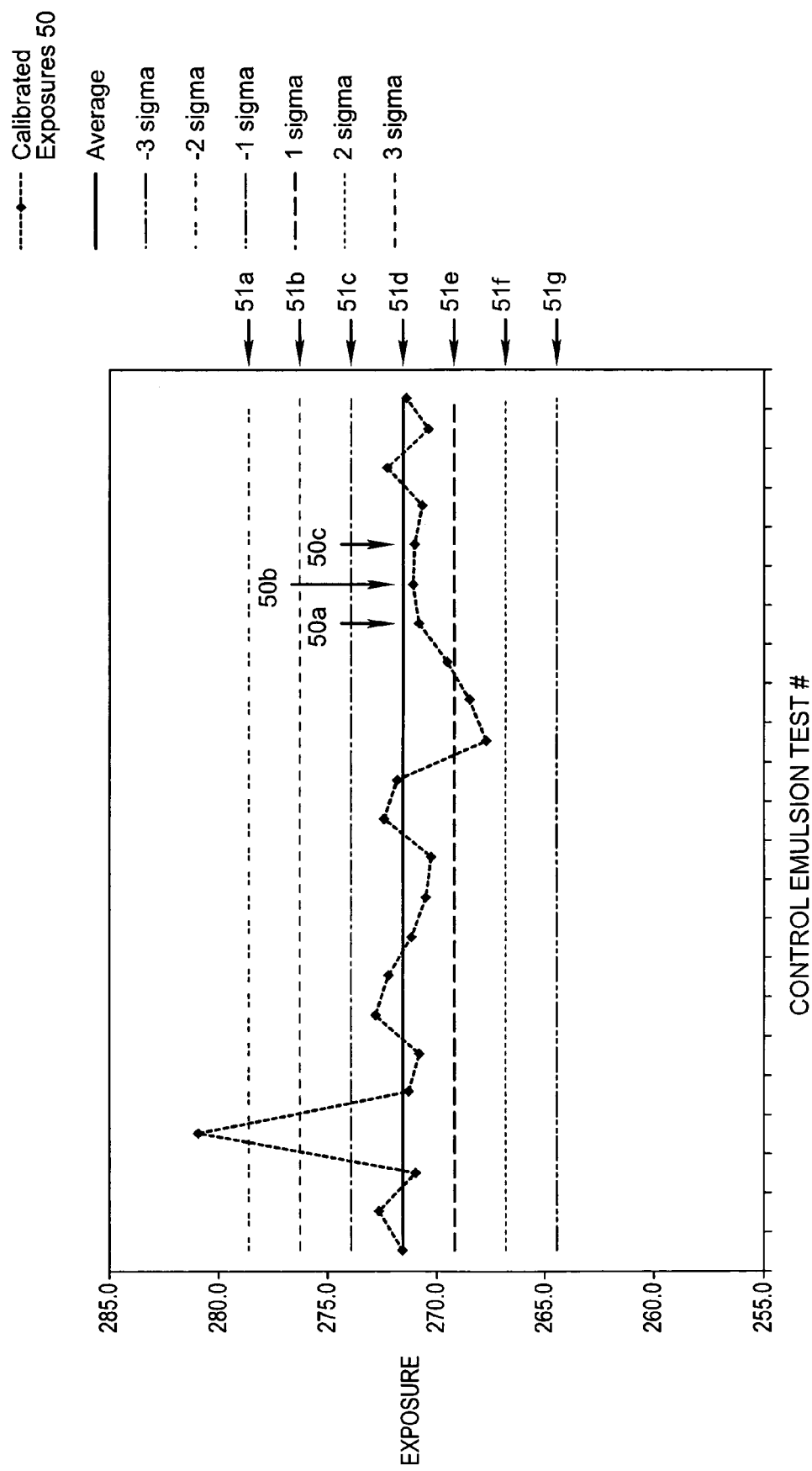
FIG. 5 is an example of a control chart for tracking the calibration performance of an imaging device for a similar set of thermal media and thermal receiver.

FIG. 5 is an example of a control chart for tracking the calibration performance of an imaging device for a similar set of thermal media and thermal receiver. Calibrated exposures 50a, 50b, and 50c are plotted for a single density request using a calibration curve 38 (not shown in FIG. 5) for similar emulsions imaged at different points in time. The average exposure 51d for a density request is calculated along with the −3, −2, −1, 1, 2 and 3 standard deviation differences from the average exposure 51a, 51b, 51 c, 51e, 51f, and 51g. The imaging device is considered in control if the following criteria are met: (1) single exposure does not exist beyond three standard deviation unit distances from an average exposure line; (2) two out of three exposures do not exist on the same side of an average exposure line and not more than two standard deviation units beyond the average exposure line; (3) four out of five exposures do not exist on the same side of an average exposure line and no more than one standard deviation unit beyond the average exposure line; and (4) eight out of nine points do not exist on the same side of an average exposure line. If the stated specifications are violated then the control imaging device will require servicing.

Inevitably a control thermal donor set will run out and require replacement. Acceptable alternate thermal donors and thermal receivers can be located by evaluating their calibrated exposure performance. Thermal media and thermal receiver emulsions that test within one sigma of the average exposure are good candidates for using as a new control material.

Due to loss of efficiency, the control imaging device will exhibit exposure drift over time and therefore require servicing, however, the control imaging device exposure stability may not be guaranteed after servicing.

When attempting to calibrate thermal donors on a control imaging device and exporting the calibration such that a remote imaging device can use the calibration data to bypass performing calibration on the lot of thermal donor, the stability of the control imaging device becomes critical. As discussed the control imaging device will exhibit drift over time. Media lots calibrated at a significantly different time will therefore inherit drift due to control imaging apparatus drift. A first (customer) imaging apparatus may image two media lots that were characterized at different points in time possibly causing a change in performance. A guarantee cannot be placed on the order of distribution of media therefore the control imaging device exposures must remain constant if exposures are to be exported to remote customer imaging devices.

Figure 6:
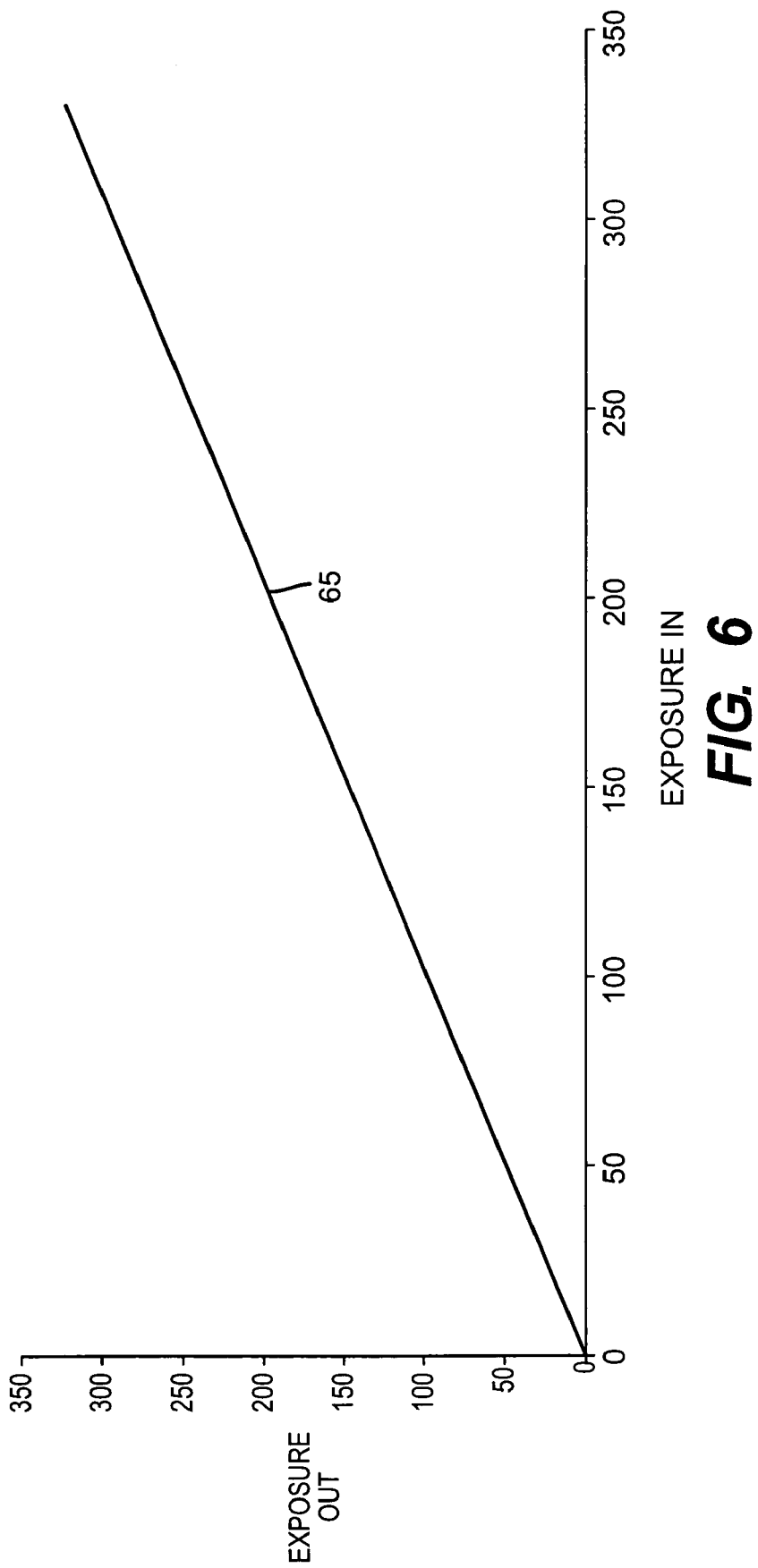
FIG. 6 examples compensating for control imaging device drift by using an exposure modification curve to modify the exposure calibration curve.

One method to compensate for control imaging device drift is to use an exposure modification curve 65 as seen in FIG. 6 to modify the exposure calibration curve 38 (not shown in FIG. 6). If the control imaging device experiences a detectable drift in exposure and the exposure drift cannot be removed through servicing, the exposure modification curve 65 can be modified such that adjusted calibrated exposures for a control thermal donor set are returned to the average calibrated exposure for the control thermal donor set by modifying the original calibrated thermal donor set exposures by the exposure modification curve 65.

Once a control imaging device is shown to be producing stable output calibrated exposures for a control thermal media set, the control imaging device can be used to produce calibrated exposures for various lots of thermal donors and thermal receivers. A thermal donor's sensitometric curve can be characterized using an exposure series on a control imaging device and a control thermal receiver.

Figure 7:
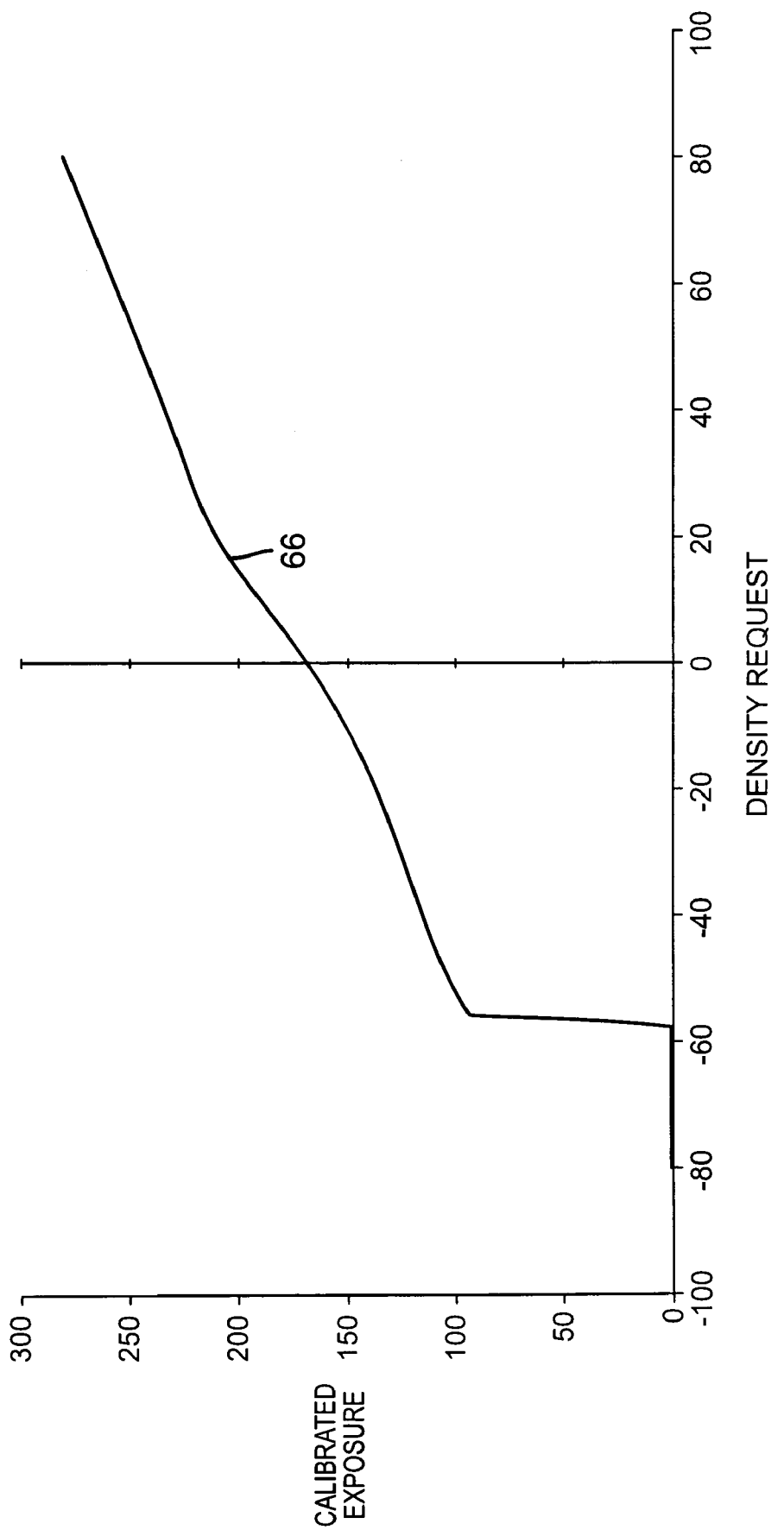
FIG. 7 examples calibrated exposures for thermal donors.

Calibrated exposures 66 for thermal donors shown in FIG. 7 can be made available for export to remote locations through internet distribution, hardcopy mail distribution, or coded into a radio frequency ID tag associated with a roll of thermal donor material.

Figure 8:
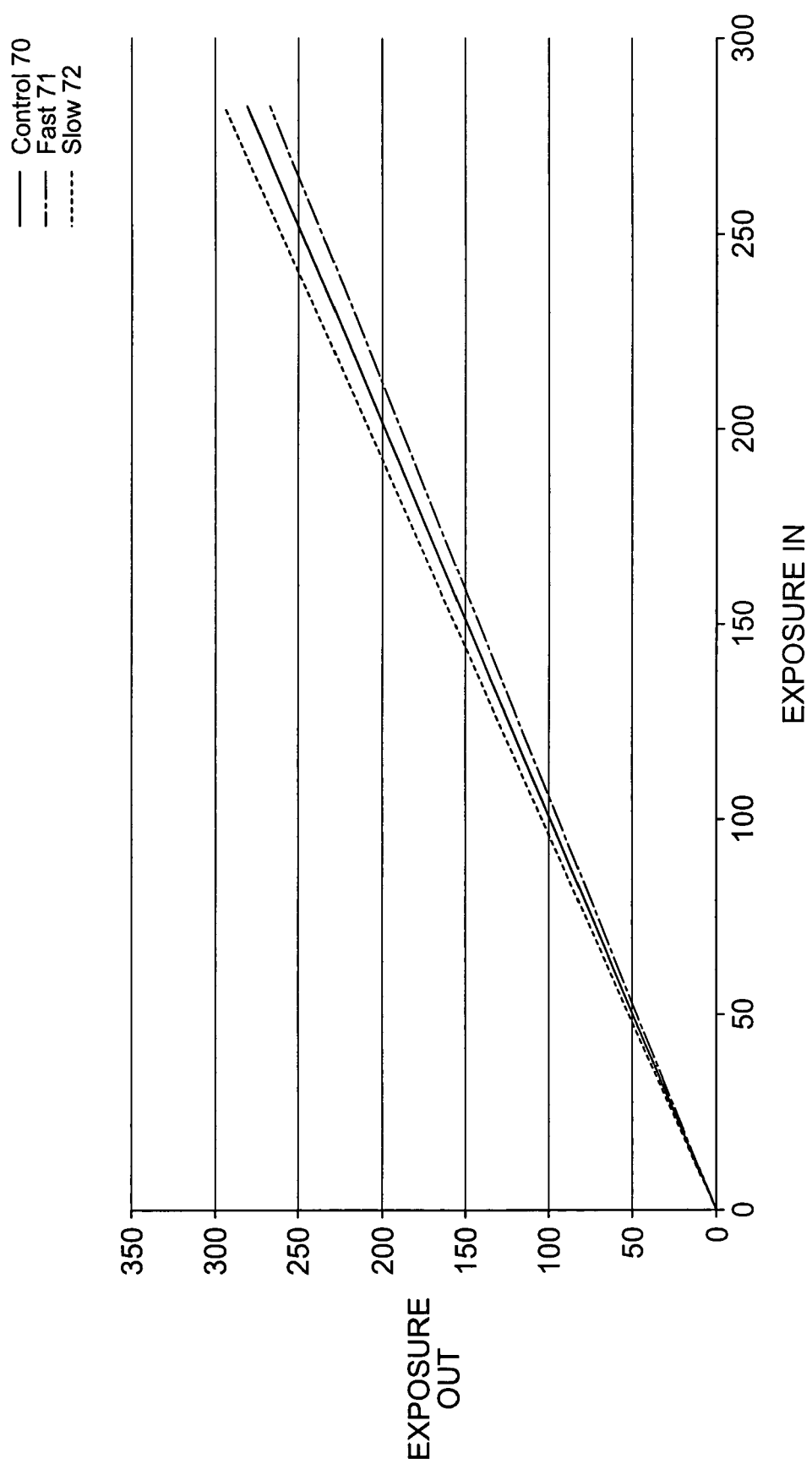
FIG. 8 examples an exposure modification curve for a thermal receiver.

An exposure modification curve for a thermal receiver lot can be seen in FIG. 8. The exposure modification curve for thermal receiver lot can be calculated by plotting a control thermal donor and control thermal receiver's sensitometric curve on a control imaging device against a control thermal donor and unique thermal receiver's sensitometric curve on a control imaging device. The resulting exposure modification curve for an individual lot of thermal media can be faster 71 or slower 72 than the control thermal media exposure modification curve 70.

Exposure modification curves for thermal receiver 70, 71, and 72 can be made available for export to remote locations through internet distribution, hardcopy mail distribution, or coded into a radio frequency ID tag associated with a roll of thermal receiver material.

With respect to calibration averaging, thermal media contains variability in sensitometric performance lot to lot. The manufacturing variability is typically large enough to require exposure calibration for each lot of thermal media and thermal receiver. Exposure calibration also exhibits variability that is typically less than the thermal media manufacturing variability.

Figure 9:
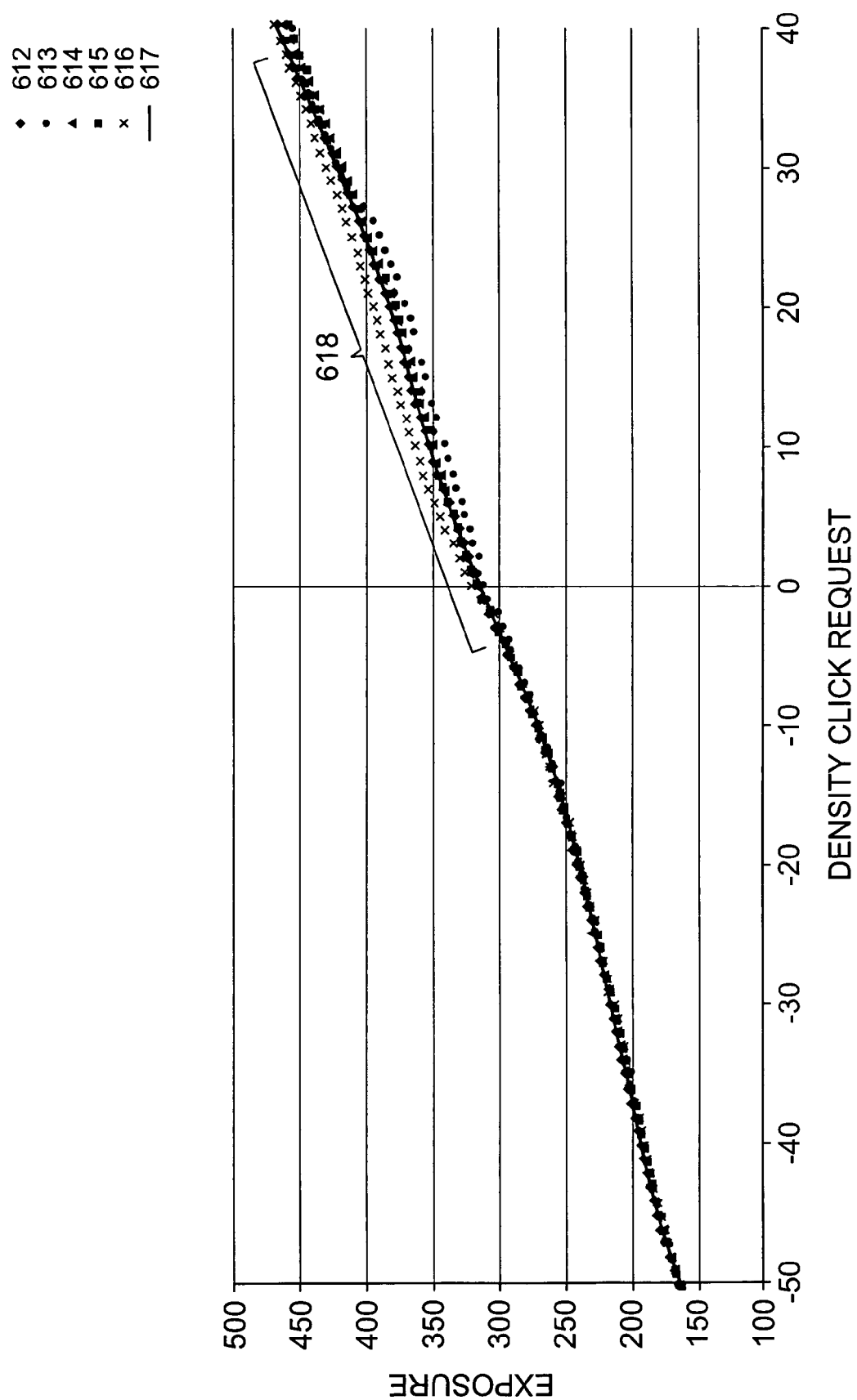
FIG. 9 shows a method to reduce the density variability due to variability of sensitometric performance.

FIG. 9 shows a method to reduce the density variability due to variability of sensitometric performance lot to lot for thermal media by averaging multiple exposure calibrations 612, 613, 614, 615, and 616 of various or individual thermal media lots. Averaging multiple exposure calibrations of individual thermal media lots will increase the amount of data available to build a density and exposure model and may improve calibration accuracy. Averaging multiple exposure calibrations for different thermal media lots will produce an exposure calibration 617 designed for an average thermal media sensitometric performance. Using an average exposure curve 617 will reduce the range of density error due to thermal media lot to lot sensitometric differences. The variability of density accuracy for an average exposure calibration curve 617 will typically be similar to the variability obtained when using unique exposure calibrations 612, 613, 614, 615, and 616 for individual thermal media lots. The variability of density accuracy for an average exposure calibration curve 617 can be larger if an outlier thermal media lot is used for the calculation of an average exposure calibration curve 617 or if an outlier thermal media is imaged using an average exposure calibration curve.

Averaging can be used in conjunction with the exposure lookup calibration calculation. Multiple exposure calibration curves 80, 612, 613, 614, 615, and 616 can be averaged along with associated control imaging device exposure calibration curves 66 and 80 and thermal receiver exposure modification curves 80.

An advantage of using averaging for exposure calibration curves in combination with control imaging device exposure calibration curves 80, 83 and control imaging device exposure modification curves 80, 83 is that outlier thermal media sensitometric curves will be characterized and compensated when calculating and adjusting the average calibration curve 617. The manufacturing process for thermal media is therefore allowed to vary which in turn will reduce waste.

An advantage of averaging exposure calibration curves is the amount of data used in correlating a control imaging device and a first imaging device is increased resulting in an increase in accuracy.

An advantage of averaging exposure calibration curves is to increase repeatability in noisy density areas 618. By averaging exposure calibration curves the imaging device will reduce the range of density error.

The embodiment method can alternatively include the steps of imaging a target on a first layered assembly using the image processing apparatus to create a first image and scanning the first image into host software on the image processing apparatus creating a first customer image processing apparatus exposure calibration curve. An exposure lookup curve is then calculated by plotting the first customer image processing apparatus versus the first exposure calibration curve.

A second layered assembly is loaded onto the image processing apparatus and a third exposure modification curve is calculated by using the first exposure modification curve and the second exposure modification curve. A second image processing apparatus exposure calibration curve is calculated for the second layered assembly by applying the exposure lookup curve to the second exposure calibration curve.

The method ends by adjusting the second image processing apparatus exposure calibration curve using the third exposure modification curve to create a resultant exposure calibration curve. The resultant exposure calibration curve is applied to the image processing apparatus for use with the second layered assembly.

The embodiments have been described in detail with particular reference to certain embodiments thereof, but it will be understood that variations and modifications can be effected within the scope of the embodiments, especially to those skilled in the art.

PARTS LIST

36*a* density
36*b* density
36*c* density
38 calibration curve
38*a* toe exposure
38*b* polynomial
38*c* shoulder exposure
40 set of density
40*a* density request
40*b* density request
40*c* density request
50*a* calibrated exposure
50*b* calibrated exposure
50*c* calibrated exposure
51*a* control limit
51*b* control limit
51*c* control limit
51*d* control limit
51*e* control limit
51*f* control limit
51*g* control limit
65 exposure modification curve
66 calibrated exposure curve
70 exposure modification curve
71 exposure modification curve
72 exposure modification curve
80 calibration curves
112 image processor housing
114 image processor door
115 media drive mechanism
116 media carousel
118*a* donor material
118*b* roll media
118*c* roll media
118*c* roll media
118*d* roll media
118*e* roll media
118*f* roll media
118*g* thermal print media
120 laser assembly
122 laser diodes
124 fiber optic cables
126 distribution block 128 printhead
130 vacuum imaging drum
132 donor ejection chute
134 donor waste bin
136 transport mechanism
137 exit tray
140 knife blade
142 knife blade
144 media knife assembly
146 drum load roller
148 translation bearing rods
150 translation bearing rods
612 calibration curve
613 exposure calibration curve
614 exposure calibration curve
615 exposure calibration curve
615 exposure calibration curve
616 exposure calibration curve
617 exposure calibration curve
618 exposure variability
700 step of obtaining a plurality of individual exposure levels for an image processing apparatus
710 step of plotting individual exposure levels against time to obtain a deviation history for the image processing apparatus relative to print density
720 step of comparing the deviation history to an operating specification for the image processing apparatus to determine if the image processing apparatus has drifted off the operating specification
730 step of adjusting exposure levels for the image processing apparatus if the data points are outside of the operating specifications
740 step of preparing a calibration curve of exposure level versus density for a plurality of shipped thermal donors
750 step of comparing the value of a control thermal receiver to a plurality of shipped thermal receivers to form an exposure modification curve
760 step of transmitting said calibration curve to the image processing apparatus
770 step of transmitting said exposure modification curve to the image processing apparatus
780 adjusting the first image processing apparatus exposure levels to conform to the calibration curve and the exposure modification curve

The invention claimed is:

1. A method for calibrating a first image processing apparatus at a first location with a control image processing apparatus at a second location, wherein the method comprises the steps of:
   a. obtaining a plurality of individual exposure levels for the control image processing apparatus;
   b. plotting the individual exposure levels against time to obtain a deviation history for the control image processing apparatus;
   c. comparing the deviation history to an operating specification for the control image processing apparatus; and
      i. if the deviation history of the control image processing apparatus is within the operating specification, initiate a calibration, wherein the calibration comprises:
         1. preparing a calibration curve of exposure level versus density for a plurality of shipped thermal donors;
         2. computing an exposure modification curve by comparing a control thermal receiver to the shipped thermal receivers;
         3. transmitting the calibration curve to the first image processing apparatus;
         4. transmitting the exposure modification curve to the first image processing apparatus; and
         5. adjusting the first image processing apparatus exposure levels to conform to the calibration curve and the exposure modification curve; and
      ii. if the deviation history of the control image processing apparatus is outside the operating specification, adjust the exposures levels of the control image processing apparatus to be within the operating specification, and then initiate a calibration using the steps (1) to (5) above.

2. The method of claim 1, wherein the first image processing apparatus and the control image processing apparatus are a member of the group: a laser printer, an ink jet printer, an offset press, a photocopier, a fax machine, or combinations thereof.

3. The method of claim 1, wherein the step of transmitting the calibration curve to the first image processing apparatus is performed using a radio frequency identification (RFID) tag attached to each shipped thermal donor.

4. The method of claim 1, wherein the step of transmitting the calibration curve to the first image processing apparatus is performed electronically.

5. The method of claim 1, wherein the step of transmitting the exposure modification curve to the first image processing apparatus is performed using a radio frequency identification (RFID) tag attached to each shipped thermal receiver.

6. The method of claim 1, wherein the step of transmitting the exposure modification curve to the first image processing apparatus is performed electronically.

7. The method of claim 1, further comprising the steps of:
   a. loading a first layered assembly onto the first image processing apparatus, wherein the first layered assembly comprises a first thermal donor comprising a first exposure calibration curve measured from the control image processing apparatus, wherein the first thermal donor is disposed on a first thermal receiver comprising a first exposure modification curve measured from the control image processing apparatus;
   b. imaging a target on the first layered assembly using the first image processing apparatus and forming a first image;
   c. scanning the first image into host software on the first image processing apparatus and forming a first exposure calibration curve for the first image processing apparatus;
   d. loading a second layered assembly onto the first image processing apparatus, wherein the second layered assembly comprises a second thermal donor comprising a second exposure calibration curve measured from the control image processing apparatus, and wherein the second thermal donor is disposed on a second thermal receiver comprising a second exposure modification curve measured from the control image processing apparatus;
   e. imaging the target on the second layered assembly using the first image processing apparatus and forming a second image;
   f. scanning the second image into the host software on the first image processing apparatus and forming a second exposure calibration curve for the first image processing apparatus;
   g. averaging the first exposure calibration curve for the first image processing apparatus with the second exposure calibration curve for the first image processing apparatus to create an average exposure calibration curve for the first image processing apparatus;

h. averaging the first exposure calibration curve measured from the control image processing apparatus and the second exposure calibration curve measured from the control image processing apparatus to create an average exposure calibration curve for the control image processing apparatus;

i. calculating an exposure lookup curve by plotting the average exposure calibration curve for the first image processing apparatus against the average exposure calibration curve for the control image processing apparatus;

j. averaging the first exposure modification curve from the control image processing apparatus and the second exposure modification curve from the control image processing apparatus to create an averaged exposure modification curve;

k. loading a third layered assembly onto the first image processing apparatus; wherein the third layered assembly comprises a third thermal donor comprising a third exposure calibration curve measured from the control image processing apparatus, and wherein the third thermal donor is disposed on a third thermal receiver comprising a third exposure modification curve measured from the control image processing apparatus;

l. calculating a fourth exposure modification curve by using the averaged exposure modification curve and the third exposure modification curve from the control image processing apparatus;

m. applying the exposure lookup curve to the third exposure calibration curve measured from the control image processing apparatus to form a third exposure calibration curve for the first image processing apparatus; and n. adjusting the third exposure calibration curve for the first image processing apparatus using the fourth exposure modification curve to create a resultant exposure calibration curve, wherein the resultant exposure calibration curve is applied to the first image processing apparatus for use with the third layered assembly.

8. A method as in claim 1, further comprising the steps of:

a. loading a first layered assembly onto the first image processing apparatus, wherein the first layered assembly comprises a first thermal donor comprising a first exposure calibration curve measured from the control image processing apparatus, wherein the first thermal donor is disposed on a first thermal receiver comprising a first exposure modification curve measured from the control image processing apparatus;

b. imaging a target on the first layered assembly using the first image processing apparatus and forming a first image;

c. scanning the first image into host software on the first image processing apparatus and forming a first exposure calibration curve for the first image processing apparatus;

d. calculating an exposure lookup curve by plotting the first exposure calibration curve for the first image processing apparatus against the first exposure calibration curve for the control image processing apparatus;

e. loading a second layered assembly onto the first image processing apparatus, wherein the second layered assembly comprises a second thermal donor comprising a second exposure calibration curve measured from the control image processing apparatus, and wherein the second thermal donor is disposed on a second thermal receiver comprising a second exposure modification curve measured from the control image processing apparatus;

f. calculating an exposure modification curve by using the second exposure modification curve from control image processing apparatus and the first exposure modification curve from the control image processing apparatus;

g. applying the exposure lookup curve to the second exposure calibration curve measured from the control image processing apparatus to form a second exposure calibration curve for the first image processing apparatus; and h. adjusting the second exposure calibration curve for the first image processing apparatus using the exposure modification curve to create a resultant exposure calibration curve, wherein the resultant exposure calibration curve is applied to the first image processing apparatus for use with the second layered assembly.

9. The method of claim 8, wherein the image processing apparatus is a laser printer, an ink jet printer, an offset press, a photocopier, a fax machine, or combinations thereof.

10. The method of claim 8, wherein the step of transmitting the calibration curve to the image processing apparatus is preformed using a radio frequency identification (RFID) tag attached to each shipped thermal donor.

11. The method of claim 8, wherein the step of transmitting the calibration curve to the image processing apparatus is performed electronically.

12. The method of claim 8, wherein the step of transmitting the exposure modification curve to the image processing apparatus is preformed using a radio frequency identification (RFID) tag attached to each shipped thermal receiver.

13. The method of claim 8, wherein the step of transmitting the exposure modification curve to the image processing apparatus is preformed electronically.

14. A method for calibrating a first image processing apparatus at a first location with a control image processing apparatus at a second location, wherein the method comprises the steps of:

a. preparing a calibration curve of exposure level versus density for a plurality of shipped thermal donors;

b. computing an exposure modification curve by comparing a control thermal receiver to the shipped thermal receivers;

c. transmitting the calibration curve to the first image processing apparatus;

d. transmitting the exposure modification curve to the first image processing apparatus; and e. adjusting the first image processing apparatus exposure levels to conform to the calibration curve and the exposure modification curve.

15. The method of 14, further comprising the steps of a. loading a first layered assembly onto the first image processing apparatus, wherein the first layered assembly comprises a first thermal donor comprising a first exposure calibration curve measured from the control image processing apparatus, wherein the first thermal donor is disposed on a first thermal receiver;

b. imaging a target on the first layered assembly using the first image processing apparatus and forming a first image;

c. scanning the first image into host software on the first image processing apparatus and forming a first exposure calibration curve for the first image processing apparatus;

d. calculating an exposure lookup curve by plotting the first exposure calibration curve for the first image processing apparatus against the first exposure calibration curve for the control image processing apparatus;

e. loading a second layered assembly onto the first image processing apparatus, wherein the second layered assembly comprises a second thermal donor comprising a second exposure calibration curve measured from the control image processing apparatus, and wherein the second thermal donor is disposed on a second thermal receiver; and f. applying the exposure lookup curve to the second exposure calibration curve measured from the control image processing to form a second exposure calibration curve for the first image processing apparatus;

g. calculating an exposure modification curve by using the second exposure modification curve from control image processing apparatus and the first exposure modification curve from the control image processing apparatus;

h. adjusting the second exposure calibration curve for the first image processing apparatus using the exposure modification curve to create a resultant exposure calibration curve, wherein the resultant exposure calibration curve is applied to the first image processing apparatus for use with the second layered assembly; and i. adjusting the first image processing apparatus exposure levels to conform to the calibration curve and the exposure modification curve.

* * * * *